US008396709B2

(12) United States Patent
Lloyd et al.

(10) Patent No.: US 8,396,709 B2
(45) Date of Patent: Mar. 12, 2013

(54) SPEECH RECOGNITION USING DEVICE DOCKING CONTEXT

(75) Inventors: Matthew I. Lloyd, Cambridge, MA (US); Pankaj Risbood, Bangalore (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,466

(22) Filed: Sep. 30, 2011

(65) Prior Publication Data

US 2012/0191449 A1     Jul. 26, 2012

Related U.S. Application Data

(63) Continuation of application No. 13/040,553, filed on Mar. 4, 2011.

(60) Provisional application No. 61/435,022, filed on Jan. 21, 2011.

(51) Int. Cl.
*G10L 15/00*     (2006.01)
*G10L 21/00*     (2006.01)

(52) U.S. Cl. ......................... 704/231; 704/270

(58) Field of Classification Search ........... 704/231–257
See application file for complete search history.

(56) References Cited

U.S. PATENT DOCUMENTS

| | | | |
|---|---|---|---|
| 5,267,345 A | 11/1993 | Brown et al. | |
| 5,632,002 A | 5/1997 | Hashimoto et al. | |
| 5,638,487 A | 6/1997 | Chigier | |
| 5,715,367 A | 2/1998 | Gillick et al. | |
| 5,737,724 A | 4/1998 | Atal et al. | |
| 5,822,730 A | 10/1998 | Roth et al. | |
| 6,021,403 A | 2/2000 | Horvitz et al. | |
| 6,119,186 A * | 9/2000 | Watts et al. | 710/104 |
| 6,167,377 A | 12/2000 | Gillick et al. | |
| 6,182,038 B1 | 1/2001 | Balakrishnan et al. | |
| 6,317,712 B1 | 11/2001 | Kao et al. | |
| 6,397,180 B1 | 5/2002 | Jaramillo et al. | |
| 6,418,431 B1 | 7/2002 | Mahajan et al. | |
| 6,446,041 B1 | 9/2002 | Reynar et al. | |
| 6,539,358 B1 | 3/2003 | Coon et al. | |
| 6,581,033 B1 | 6/2003 | Reynar et al. | |
| 6,678,415 B1 | 1/2004 | Popat et al. | |
| 6,714,778 B2 | 3/2004 | Nykänen et al. | |
| 6,778,959 B1 | 8/2004 | Wu et al. | |
| 6,839,670 B1 | 1/2005 | Stammler et al. | |
| 6,876,966 B1 | 4/2005 | Deng et al. | |
| 6,912,499 B1 | 6/2005 | Sabourin et al. | |
| 6,922,669 B2 | 7/2005 | Schalk et al. | |
| 6,950,796 B2 | 9/2005 | Ma et al. | |

(Continued)

FOREIGN PATENT DOCUMENTS

| | | |
|---|---|---|
| DE | 100 45 020 | 5/2001 |
| WO | WO02/096070 | 11/2002 |

OTHER PUBLICATIONS

U.S. Appl. No. 12/845,034, filed Jul. 28, 2010, 63 pages.

(Continued)

*Primary Examiner* — Samuel G Neway
(74) *Attorney, Agent, or Firm* — Fish & Richardson P.C.

(57) ABSTRACT

Methods, systems, and apparatuses, including computer programs encoded on a computer storage medium, for performing speech recognition using dock context. In one aspect, a method includes accessing audio data that includes encoded speech. Information that indicates a docking context of a client device is accessed, the docking context being associated with the audio data. A plurality of language models is identified. At least one of the plurality of language models is selected based on the docking context. Speech recognition is performed on the audio data using the selected language model to identify a transcription for a portion of the audio data.

28 Claims, 4 Drawing Sheets

U.S. PATENT DOCUMENTS

| | | | |
|---|---|---|---|
| 6,959,276 B2 | 10/2005 | Droppo et al. |
| 7,027,987 B1 | 4/2006 | Franz et al. |
| 7,043,422 B2 | 5/2006 | Gao et al. |
| 7,149,688 B2 | 12/2006 | Schalkwyk |
| 7,149,970 B1 | 12/2006 | Pratley et al. |
| 7,174,288 B2 | 2/2007 | Ju et al. |
| 7,200,550 B2 | 4/2007 | Menezes et al. |
| 7,257,532 B2 | 8/2007 | Toyama |
| 7,310,601 B2 | 12/2007 | Nishizaki et al. |
| 7,366,668 B1 | 4/2008 | Franz et al. |
| 7,370,275 B2 | 5/2008 | Haluptzok et al. |
| 7,383,553 B2 | 6/2008 | Atkin et al. |
| 7,392,188 B2 | 6/2008 | Junkawitsch et al. |
| 7,403,888 B1 | 7/2008 | Wang et al. |
| 7,424,426 B2 | 9/2008 | Furui et al. |
| 7,424,428 B2 * | 9/2008 | Rose et al. ............. 704/257 |
| 7,451,085 B2 | 11/2008 | Rose et al. |
| 7,505,894 B2 | 3/2009 | Menezes et al. |
| 7,526,431 B2 | 4/2009 | Roth et al. |
| 7,577,562 B2 | 8/2009 | Menezes et al. |
| 7,634,720 B2 | 12/2009 | Haluptzok et al. |
| 7,672,833 B2 | 3/2010 | Blume et al. |
| 7,698,124 B2 | 4/2010 | Menezes et al. |
| 7,698,136 B1 | 4/2010 | Nguyen et al. |
| 7,752,046 B2 | 7/2010 | Bacchiani et al. |
| 7,778,816 B2 | 8/2010 | Reynar |
| 7,805,299 B2 | 9/2010 | Coifman |
| 7,831,427 B2 | 11/2010 | Potter et al. |
| 7,848,927 B2 | 12/2010 | Ohno et al. |
| 7,881,936 B2 | 2/2011 | Longé et al. |
| 7,890,326 B2 | 2/2011 | Strope et al. |
| 7,907,705 B1 | 3/2011 | Huff et al. |
| 7,941,189 B2 | 5/2011 | Miyauchi |
| 7,953,692 B2 | 5/2011 | Bower et al. |
| 7,996,220 B2 | 8/2011 | Rose et al. |
| 8,001,130 B2 | 8/2011 | Wen et al. |
| 8,005,680 B2 | 8/2011 | Kommer |
| 8,009,678 B2 | 8/2011 | Brooke |
| 8,027,973 B2 | 9/2011 | Cao et al. |
| 8,060,373 B2 | 11/2011 | Gibbon et al. |
| 8,069,027 B2 | 11/2011 | Liu et al. |
| 8,069,043 B2 | 11/2011 | Bacchiani et al. |
| 2002/0062216 A1 | 5/2002 | Guenther et al. |
| 2002/0087309 A1 | 7/2002 | Lee et al. |
| 2002/0111990 A1 | 8/2002 | Wood et al. |
| 2003/0050778 A1 * | 3/2003 | Nguyen et al. ............ 704/235 |
| 2003/0149561 A1 * | 8/2003 | Zhou ........................ 704/240 |
| 2003/0216919 A1 | 11/2003 | Roushar |
| 2003/0236099 A1 | 12/2003 | Deisher et al. |
| 2004/0024583 A1 | 2/2004 | Freeman |
| 2004/0043758 A1 | 3/2004 | Sorvari et al. |
| 2004/0049388 A1 | 3/2004 | Roth et al. |
| 2004/0098571 A1 * | 5/2004 | Falcon ........................ 713/1 |
| 2004/0138882 A1 | 7/2004 | Miyazawa |
| 2004/0172258 A1 | 9/2004 | Dominach et al. |
| 2004/0230420 A1 | 11/2004 | Kadambe et al. |
| 2004/0243415 A1 | 12/2004 | Commarford et al. |
| 2005/0005240 A1 | 1/2005 | Reynar et al. |
| 2005/0108017 A1 | 5/2005 | Esser et al. |
| 2005/0114474 A1 * | 5/2005 | Anderson et al. ............. 709/220 |
| 2005/0187763 A1 | 8/2005 | Arun |
| 2005/0193144 A1 * | 9/2005 | Hassan et al. ............. 709/238 |
| 2005/0216273 A1 | 9/2005 | Reding et al. |
| 2005/0246325 A1 | 11/2005 | Pettinati et al. |
| 2005/0283364 A1 | 12/2005 | Longe et al. |
| 2006/0004572 A1 | 1/2006 | Ju et al. |
| 2006/0004850 A1 | 1/2006 | Chowdhury |
| 2006/0009974 A1 | 1/2006 | Junqua et al. |
| 2006/0035632 A1 | 2/2006 | Sorvari et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0212288 A1 | 9/2006 | Sethy et al. |
| 2006/0247915 A1 | 11/2006 | Bradford et al. |
| 2007/0060114 A1 | 3/2007 | Ramer et al. |
| 2007/0174040 A1 | 7/2007 | Liu et al. |
| 2008/0027723 A1 | 1/2008 | Reding et al. |
| 2008/0091406 A1 | 4/2008 | Baldwin et al. |
| 2008/0091435 A1 | 4/2008 | Strope et al. |
| 2008/0091443 A1 | 4/2008 | Strope et al. |
| 2008/0131851 A1 | 6/2008 | Kanevsky et al. |
| 2008/0133228 A1 | 6/2008 | Rao |
| 2008/0188271 A1 | 8/2008 | Miyauchi |
| 2008/0221887 A1 | 9/2008 | Rose et al. |
| 2008/0221902 A1 * | 9/2008 | Cerra et al. ............. 704/270.1 |
| 2008/0301112 A1 | 12/2008 | Wu |
| 2009/0030687 A1 | 1/2009 | Cerra et al. |
| 2009/0030696 A1 | 1/2009 | Cerra et al. |
| 2009/0150160 A1 | 6/2009 | Mozer |
| 2009/0164216 A1 | 6/2009 | Chengalvarayan et al. |
| 2009/0210214 A1 | 8/2009 | Qian et al. |
| 2009/0271177 A1 | 10/2009 | Menezes et al. |
| 2009/0271188 A1 | 10/2009 | Agapi et al. |
| 2009/0287681 A1 | 11/2009 | Paek et al. |
| 2009/0292529 A1 | 11/2009 | Bangalore et al. |
| 2010/0004930 A1 | 1/2010 | Strope et al. |
| 2010/0049502 A1 | 2/2010 | Oppenheim et al. |
| 2010/0088303 A1 | 4/2010 | Chen et al. |
| 2010/0100377 A1 | 4/2010 | Madhavapeddi et al. |
| 2010/0153219 A1 | 6/2010 | Mei et al. |
| 2010/0179803 A1 | 7/2010 | Sawaf et al. |
| 2010/0254521 A1 | 10/2010 | Kriese et al. |
| 2010/0318531 A1 | 12/2010 | Gao et al. |
| 2010/0325109 A1 | 12/2010 | Bai et al. |
| 2011/0004462 A1 | 1/2011 | Houghton et al. |
| 2011/0066577 A1 | 3/2011 | Van Gael et al. |
| 2011/0077943 A1 * | 3/2011 | Miki et al. ............. 704/250 |
| 2011/0093265 A1 * | 4/2011 | Stent et al. ............. 704/243 |
| 2011/0137653 A1 | 6/2011 | Ljolje et al. |
| 2011/0162035 A1 * | 6/2011 | King et al. ............. 726/1 |
| 2011/0231183 A1 | 9/2011 | Yamamoto et al. |
| 2011/0257974 A1 | 10/2011 | Kristjansson et al. |
| 2011/0288868 A1 | 11/2011 | Lloyd et al. |
| 2011/0295590 A1 | 12/2011 | Lloyd et al. |

OTHER PUBLICATIONS

U.S. Appl. No. 12/782,862, filed May 19, 2010, 44 pages.

U.S. Appl. No. 12/851,881, filed Aug. 6, 2010, 64 pages.

Authorized Officer H. Van Doremalen. International Search Report and Written Opinion in International Application No. PCT/US2012/021221, dated Apr. 5, 2012, 11 pages.

United States Office Action in U.S. Appl. No. 13/249,172, mailed Dec. 29, 2011, 17 pages.

United States Office Action in U.S. Appl. No. 13/249,181, mailed Dec. 23, 2011, 23 pages.

United States Office Action in U.S. Appl. No. 12/976,920, mailed Jan. 20, 2012, 17 pages.

United States Office Action in U.S. Appl. No. 13/249,175, mailed Jan. 10, 2012, 17 pages.

United States Office Action in U.S. Appl. No. 13/249,180, mailed Dec. 27, 2011, 12 pages.

Extended European Search Report, Application No. EP 10 165 480.4, dated Oct. 24, 2011, 68 pages.

Frey, B., et al., "ALGONQUIN: Iterating Laplace's Method to Remove Multiple Types of Acoustic Distortion for Robust Speech Recognition", EUROSPEECH 2001 Scandinavia, 7th European Conference on Speech Communication and Technology, Aalborg, Denmark, Sep. 3-7, 2001, [online] research.microsoft.com [retrieved on Nov. 23, 2010]. Retrieved from the Internet: <URL: http://research.microsoft.com/pubs/76516/2001-frey-eurospeech.pdf>. 4 pages.

Hongyuan Zha et al. Bipartite graph partitioning and data clustering. In Proceedings of the tenth international conference on Information and knowledge management (CIKM '01), Henrique Paques, Ling Liu, and David Grossman (Eds.). 2001, ACM, New York, NY, USA, 25-32.

Inderjit S. Dhillon. 2001. Co-clustering documents and words using bipartite spectral graph partitioning. In: Proceedings of the seventh ACM SIGKDD international conference on Knowledge discovery and data mining, (KDD '01). ACM, New York, NY, USA, 269-274. http://doi.acm.org/10.1145/502512.502550.

Kristjansson, T., et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.

Shengliang Xu et al. 2007. Using social annotations to improve language model for information retrieval. In: Proceedings of the sixteenth ACM conference on Conference on information and knowledge management, (CIKM '07). ACM, New York, NY, USA, 1003-1006. http://doi.acm.org/10.1145.

Xiaoyong Liu and W. Bruce Croft. 2004. Cluster-based retrieval using language models. In: Proceedings of the 27th annual international ACM SIGIR conference on Research and development in information retrieval, (SIGIR '04). ACM, New York, NY, USA, 186-193. http://doi.acm.org/10.1145/1008992.1009026.

Yeha Lee et al. Search Result Clustering Using Label Language Model. IJCNLP 2008, The Third International Joint Conference on Natural Language Processing. Jan. 7-12, 2008, Hyderabad, India.

Zweig, G., "New Methods for the Analysis of Repeated Utterances", INTERSPEECH 2009, 10th Annual Conference of the International Speech Communication Association, Brighton, United Kingdom, Sep. 6-10, 2009, 4 pages.

Zweig, G., et al., "Structured Models for Joint Decoding of Repeated Utterances", INTERSPEECH 2008, 9th Annual Conference of the International Speech Communication Association, Brisbane, Australia, Sep. 22-26, 2008, 4 pages.

United States Office Action in U.S. Appl. No. 12/760,147, dated Nov. 23, 2011, 13 pages.

United States Office Action in U.S. Appl. No. 12/782,862, dated Nov. 30, 2011, 24 pages.

United States Office Action in U.S. Appl. No. 12/787,568, dated Nov. 22, 2011, 16 pages.

United States Office Action in U.S. Appl. No. 13/040,553, dated Jan. 10, 2012, 23 pages.

United States Office Action in U.S. Appl. No. 13/250,496, dated Dec. 13, 2011, 6 pages.

Authorized Officer B. R. Copenheaver. International Search Report and Written Opinion in International Application no. PCT/US2011/046629, dated Dec. 9, 2011, 14 pages.

Authorized Officer R. Poquet. International Search Report and Written Opinion in International Application No. PCT/US2011/037558, dated Jul. 29, 2011, 11 pages.

Authorized Officer R. Poquet. International Search Report and Written Opinion in International Application No. PCT/US2011/029407, dated Jun. 7, 2011, 10 pages.

Authorized Officer I. Barabasz. International Search Report and Written Opinion in International Application No. PCT/US2011/036984, dated Aug. 31, 2011, 13 pages.

Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.

Mohri et al. Weighted Finite-State Transducers in Speech Recognition, Computer Speech & Language, vol. 16, Issue 1, Jan. 2002, pp. 69-88.

Vertanen, Keith. "An Overview of Discriminative Training for Speech Recognition." Technical Report, 2004, from http://www.inference.phy.cam.ac.uk/kv227/papers/Discriminative_Training.pdf., 14 pages.

United States Office Action in U.S. Appl. No. 13/250,496, dated May 29, 2012, 18 pages.

United States Office Action in U.S. Appl. No. 13/077,106, dated Jun. 6, 2012, 20 pages.

United States Notice of Allowance in U.S. Appl. No. 13/040,553, dated May 23, 2012, 14 pages.

\* cited by examiner

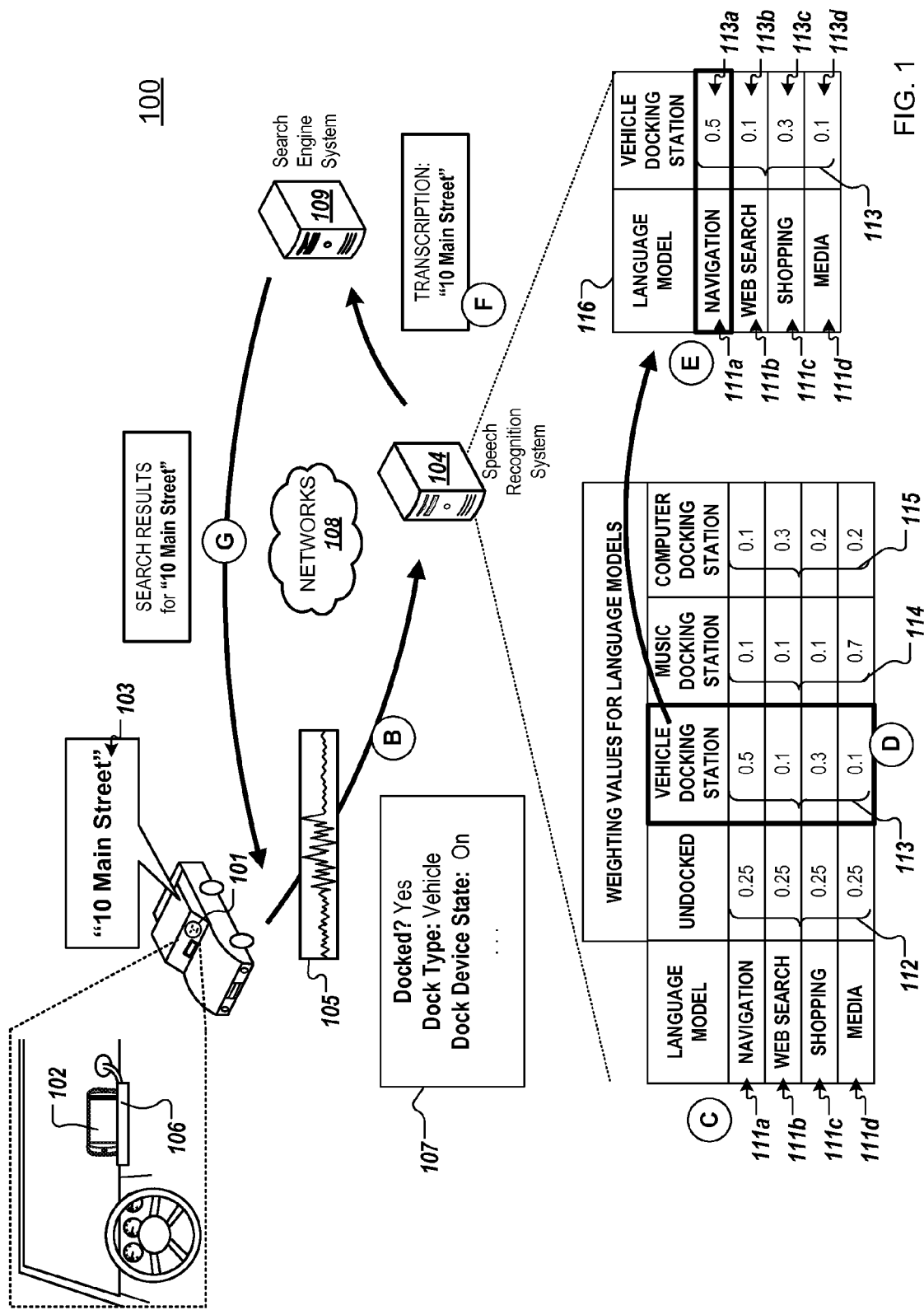

SPEECH RECOGNITION USING DEVICE DOCKING CONTEXT

CROSS REFERENCE TO RELATED APPLICATION

This application claims priority to U.S. Provisional Application No. 61/435,022, filed on Jan. 21, 2011 and U.S. Utility application Ser. No. 13/040,553 filed Mar. 4, 2011. The entire contents of these applications are incorporated herein by reference.

BACKGROUND

The use of speech recognition is becoming more and more common. As technology has advanced, users of computing devices have gained increased access to speech recognition functionality. Many users rely on speech recognition in their professions and in other aspects of daily life.

SUMMARY

In a general aspect, a computer-implemented method includes accessing audio data that includes encoded speech; accessing information that indicates a docking context of a client device, the docking context being associated with the audio data; identifying a plurality of language models; selecting at least one of the plurality of language models based on the docking context; and performing speech recognition on the audio data using the selected language model to identify a transcription for a portion of the audio data.

Implementations may include one or more of the following features. For example, the information that indicates a docking context of the client device indicates a connection between the client device and a second device with which the client device is physically connected. The information that indicates a docking context of the client device indicates a connection between the client device and a second device with which the client device is wirelessly connected. The method includes determining, for each of the plurality of language models, a weighting value to assign to the language model based on the docking context, the weighting value indicating a probability that the language model will indicate a correct transcription for the encoded speech, where selecting at least one of the plurality of language models based on the docking context includes selecting at least one of the plurality of language models based on the assigned weighting values. The speech encoded in the audio data was detected by the client device, and the information that indicates a docking context indicates whether the client device was connected to a docking station while the speech encoded in the audio data was detected by the client device. The speech encoded in the audio data was detected by the client device, and the information that indicates a docking context indicates a type of docking station to which the client device was connected while the speech encoded in the audio data was detected by the client device. The encoded speech includes one or more spoken query terms, the transcription includes a transcription of the spoken query terms, and the method further includes causing a search engine to perform a search using the transcription of the one or more spoken query terms and providing information indicating the results of the search to the client device. Determining weighting values for each of the plurality of language models includes accessing stored weighting values associated with the docking context. Determining weighting values for each of the plurality of language models includes accessing stored weighting values and altering the stored weighting values based on the docking context. Each of the plurality of language models is trained for a particular topical category of words. Determining a weighting value based on the docking context includes determining that the client device is connected to a vehicle docking station and determining, for a navigation language model trained to output addresses, a weighting value that increases the probability that the navigation language model is selected relative to the other language models in the plurality of language models.

In another general aspect, a computer-implemented method includes detecting audio containing speech at a client device; encoding the detected audio as audio data; transmitting the audio data to a server system; identifying a docking context of the device; transmitting information indicating the docking context to the server system; and receiving a transcription of at least a portion of the audio data at the client device, the server system having selected a language model from a plurality of language models based on the information indicating the docking context, generated the transcription by performing speech recognition on the audio data using the selected language model, and transmitted the transcription to the client device.

Implementations may include one or more of the following features. For example, the identified docking context is the docking context of the client device at the time the audio is detected. The information indicating a docking context of the client device indicates a connection between the client device and a second device with which the client device is physically connected. The information indicating a docking context of the client device indicates a connection between the client device and a second device with which the client device is wirelessly connected.

Other implementations of these aspects include corresponding systems, apparatus, and computer programs, configured to perform the actions of the methods, encoded on computer storage devices.

The details of one or more implementations are set forth in the accompanying drawings and the description below. Other features and advantages will become apparent from the description, the drawings, and the claims.

BRIEF DESCRIPTION OF THE DRAWINGS

FIG. 1 is a diagram illustrating an example of a system for performing speech recognition using a docking context of a client device.

DETAILED DESCRIPTION

Figure 2A:
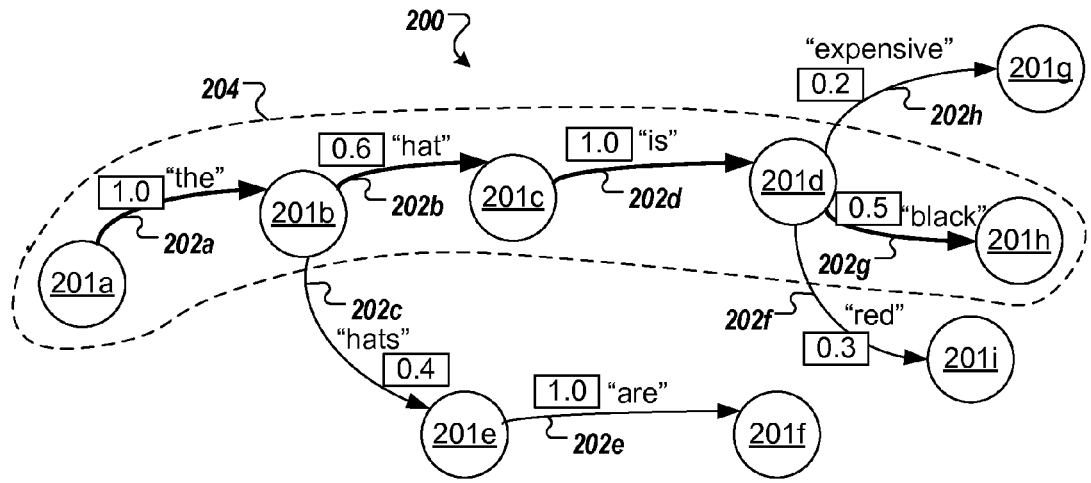
FIG. 2A is a diagram illustrating an example of a representation of a language model.

In various implementations, the docking context of a client device can be used to improve the accuracy of speech recognition. A speech recognition system can include multiple language models, each trained for a different topic or category of words. When accessing audio data that includes encoded speech, the speech recognition can also access information indicating a docking context associated with the speech. The docking context can include, for example, the docking context of a device that detected the speech, at the time the speech was detected. The speech recognition system can use the docking context to select a particular language model to use for recognizing the speech entered in that docking context.

In many instances, the docking context of a device can indicate the type of speech that a user of the device is likely to speak while the device is in that docking context. For example, a user speaking into a client device connected to a car docking station is likely to use words related to navigation or addresses. When speech is entered on a device in a vehicle docking station, the speech recognition system can select a language model trained for navigation-related words and use it to recognize the speech. By selecting a particular language model based on the docking context, the speech recognition system can bias the speech recognition process toward words most likely to have been spoken in that docking context. As a result, speech recognition using a language model selected based on docking context can yield a transcription that is more accurate than speech recognition using a generalized language model.

FIG. 1 is a diagram illustrating an example of a system 100 for performing speech recognition using a docking context of a client device 102. The system 100 includes a client communication device ("client device") 102, a speech recognition system 104 (e.g., an Automated Speech Recognition ("ASR") engine), and a search engine system 109. The client device 102, the speech recognition system 104, and the search engine system 109 communicate with each other over one or more networks 108. FIG. 1 also illustrates a flow of data during states (A) to (G).

The client device 102 can be a mobile device, such as a cellular phone or smart phone. Other examples of client device 102 include Global Positioning System (GPS) navigation systems, tablet computers, notebook computers, and desktop computers.

The client device 102 can be connected to a docking station 106. The docking station 106 can be physically coupled to the client device 102 and can communicate with the client device 102, for example, to transfer power and/or data, over a wired or wireless link. The docking station 106 can physically hold or stabilize the client device 102 (e.g., in a cradle or holster) while the client device 102 communicates with the docking station 106. The client device 102 can be directly connected to the docking station 106 or can be connected through a cable or other interface.

During state (A), a user 101 of the client device 102 speaks one or more terms into a microphone of the client device 102. In the illustrated example, the user 101 speaks the terms 103 ("10 Main Street") as part of a search query. Utterances that correspond to the spoken terms 103 are encoded as audio data 105. The terms 103 can be identified as query terms based on, for example, a search interface displayed on the client device 102, or a search control selected on the user interface of the client device 102.

The client device 102 also identifies a docking context, for example, the docking context of the client device 102 when the user 101 speaks the terms 103. In the illustrated example, the client device 102 is connected to a car docking station 106 when the user 101 speaks the terms 103. The client device 102 determines, for example, that the client device 102 is connected to the docking station 106 (e.g., the client device 102 is currently "docked"), that the docking station 106 is a vehicle docking station, and that the docking station 106 is powered on.

The docking context can be the context in which the terms 103 were spoken. For example, the docking context can include the state of the client device 102 at the time the audio corresponding to the spoken query terms 103 was detected by the client device 102. Detecting speech can include, but is not limited to, sensing, receiving, or recording speech. Detecting speech may not require determining that received audio contains speech or identifying a portion of audio that includes encoded speech, although these may occur in some implementations.

The docking context can include the identity and characteristics of the docking station to which the client device 102 is connected. For example, the docking context can include one or more of (i) whether or not the client device 102 is connected to any docking station 106, (ii) the type of docking station 106 to which the client device 102 is connected (e.g., vehicle docking station, computer, or music player), (iii) the operating state of the docking station 106 (e.g., whether the docking station 106 is on, off, idle, or in a power saving mode), and (iv) the relationship between the client device 102 and the docking station 106 (e.g., client device 102 is charging, downloading information, uploading information, or playing media, or connection is idle).

The docking context can also include other factors related to the connection between the client device 102 and the docking station 106, such as the length of time the client device 102 and the docking station 106 have been connected. The docking context can include one or more capabilities of the docking station 106 (e.g., GPS receiver, visual display, audio output, and network access). The docking context can also include one or more identifiers that indicate a model, manufacturer, and software version of the docking station 106. The docking context can also include the factors described above for multiple devices, including peripheral devices connected to the client device 102 (e.g., printers, external storage devices, and imaging devices).

In some implementations, the docking context indicates information about docking stations that are physically coupled to the client device, for example, through a cable or a direct physical link. In some implementations, the docking context indicates docking stations 106 that are determined to be in geographical proximity to the client device 102 and are connected through a wireless protocol such as Bluetooth. For example, when the client device 102 is in a vehicle, the client device 102 may wirelessly connect to a docking station 106 that is physically connected to the vehicle. Even if the client device 102 is not physically connected to the vehicle docking station 106, the wireless connection can be included in the docking context. As another example, the docking context can indicate one or more other devices in communication with the client device 102, such as a wirelessly connected earpiece. The docking context can include any of the devices with which the client device 102 is in communication.

The client device 102 generates docking context information 107 that indicates one or more aspects of the docking context. The docking context information 107 is associated with the audio data 105. For example, the docking context information 107 can indicate the docking context of the client device 102 in which the speech encoded in the audio data 105 was detected by the client device 102. The client device 102 or another system can store the docking context information 107 in association with the audio data 105.

During state (B), the speech recognition system 104 accesses the docking context information 107. The speech recognition system 104 also accesses the audio data 105. For example, the client device 102 can transmit the docking context information 107 and the audio data 105 to the speech recognition system 104. Additionally, or alternatively, the docking context information 107, the audio data 105, or both can be accessed from a storage device connected to the speech recognition system 104 or from another system.

In some implementations, the docking context information 107 can be accessed before the audio data 105, or even before the terms 103 encoded in the audio data 105 are spoken. For example, the client device 102 can be configured to provide updated docking context information 107 to the speech recognition system 104 when the docking context of the client device 102 changes. As a result, the most recently received docking context information 107 can be assumed to indicate the current docking context. The speech recognition system 104 can use the docking context information 107 to select a language model to use to recognize the first word in a speech sequence. In some implementations, the speech recognition system 104 can select the language model based on the docking context information 107 even before the user 101 begins to speak.

During state (C), the speech recognition system 104 identifies multiple language models 111a-111d. The language models 111a-111d can indicate, for example, a probability of an occurrence of a term in a sequence of terms based on other terms in the sequence. Language models and how they can be used are described in greater detail with reference to FIGS. 2A and 2B.

The language models 111a-111d can each be separately focused on a particular topic (e.g., navigation or shopping) or type of terms (e.g., names or addresses). In some instances, language models 111a-111d can be specialized for a specific action (e.g., voice dialing or playing media) or for a particular docking context (e.g., undocked, connected to a car docking station, or connected to a media docking station). As a result, the language models 111a-111d can include a subset of the vocabulary included in a general-purpose language model. For example, the language model 111a for navigation can include terms that are used in navigation, such as numbers and addresses.

The speech recognition system can identify even more fine-grained language models than those illustrated. For example, instead of a single language model 111d for media, the speech recognition system 104 can identify distinct language models (or portions of the language model 111d) that relate to video, audio, or images.

In some implementations, the language models 111a-111d identified can be submodels included in a larger, general language model. A general language model can include several language models trained specifically for accurate prediction of particular types of words. For example, one language model may be trained to predict names, another to predict numbers, and another to predict addresses, and so on.

The speech recognition system 104 can identify language models 111a-111d that are associated with the docking context indicated in the docking context information 107. For example, the speech recognition system 104 can identify language models 111a-111d that have at least a threshold probability of matching terms 103 spoken by the user 101. As another example, a particular set of language models 111a-111d can be predetermined to correspond to particular docking context.

Additionally, or alternatively, the speech recognition system 104 can identify language models 111a-111d based on previously recognized speech. For example, the speech recognition system 104 may determine that based on a prior recognized word, "play", a language model for games and a language model for media are the most likely to match terms that follow in the sequence. As a result, the speech recognition system 104 can identify the language model for games and the language model for media as language models that may be used to recognize speech encoded in the audio data 105.

During state (D), the speech recognition system 104 determines weighting values for each of the identified language models 111a-111d based on the docking context indicated in the docking context information 107. In some implementations, weighting values for each of the identified language models 111a-111d are also based on other information, such as output from a language model based on already recognized terms in a speech sequence. The weighting values that are determined are assigned to the respective of the language models 111a-111d.

The weighting values can indicate the probabilities that the terms 103 spoken by the user 101 match the types of terms included in the respective language models 111a-111d, and thus that the language models 111a-111d will indicate a correct transcription of the terms 103. For example, the weighting value assigned to the navigation language model 111a can indicate a probability that the speech encoded in the audio data 105 includes navigational terms. The weighting value assigned to the web search language model 111b can indicate a probability that the speech encoded in the audio data includes common terms generally used in web searches.

In some implementations, the speech recognition system 104 can select from among multiple sets 112, 113, 114, 115 of stored weighting values. Each set 112, 113, 114, 115 of weighting values can correspond to a particular docking context. In the example illustrated, the set 113 of weighting values corresponds to the vehicle docking station 106. Because the docking context information 107 indicates that the client device 102 is connected to a vehicle docking station 106, the speech recognition system selects the set 113 of weighting values corresponding to a vehicle docking station 106. The weighting values within the set 113 are assigned to the respective language models 111a-111d.

The weighting values in various sets 112, 113, 114, 115 can be determined by, for example, performing statistical analysis on a large number of terms spoken by various users in various docking contexts. The weighting value for a particular language model given a particular docking context can be based on the observed frequency that the language model yields accurate results in that docking context. If, for example, the navigation language model 111a predicts speech correctly for 50% of speech that occurs when a client device 102 is in a vehicle docking station, then the weighting value for the navigation language model 111a in the set 113 can be 0.5. An example of how a language model predicts speech is described below with reference to FIGS. 2A and 2B.

In some implementations, the speech recognition system 104 can determine weighting values for the language models 111a-111d by adjusting an initial set of weighting values. For example, a set 112 of weighting values can be used when the docking context information 107 indicates that the client device 102 is undocked, or when the docking context of the client device 102 is unknown. When docking context information 107 indicates the client device 102 is docked, individual weighting values of the set 112 can be changed based on various aspects of the docking context. Weighting values can be determined using formulas, look-up tables, and other methods. In some implementations, the speech recognition system 104 can use docking context to select from among sets of stored weighting values that each correspond to a key phrase. The sets 112, 113, 114, 115 of weighting values are not required to be associated directly to a single docking context. For example, the set 112 may be associated with the key phrase "navigate to." When the user 101 speaks the terms "navigate to," the set 112 is selected whether the docking context is known or not. Also, when the client device 102 is known to be in the vehicle docking station 106, the set 112 can be selected as if the user had spoken the key phrase "navigate to," even if the user 101 did not speak the key phrase.

Docking context can influence various determinations and types of weighting values that are ultimately used to select a language model, such as from a start state to a state associated with one or more key phrases, or from weighting values associated with a key phrase to the selection of a particular language model. Docking context can be used to determine weighting values used to select one or more states corresponding to key phrases, and the states corresponding to key phrases can in turn be associated with weighting values for language models 111a-111d. For example, the vehicle docking context can be used to determine a weighting value of "0.6" for a state corresponding to the phrase "navigate to" and a weighting value of "0.4" for a state corresponding to the phrase "call." Each key phrase state can be associated with a set of weighting values that indicates the likelihood of various language models from that state.

Even after a state corresponding to a key phrase has been selected, and the set of weighting values indicating the probabilities of various language models 111a-111d has been selected, docking context can be used to modify the weighting values. For example, a state associated with the phrase "navigate to" may include weighting values that indicate that a navigation language model is twice as likely as a business language model. The docking context can be used to modify the weighting values so that, for recognition of the current dictation, the navigation language model is three times as likely as the business language model.

During state (E), the speech recognition system 104 selects a language model based on the assigned weighting values. As illustrated in table 116, weighting values 113a-113d from the set 113 are assigned to the language models 111a-111d. These weighting values 113a-113d indicate the probability that the corresponding language models 111a-111d match the terms 103 spoken by the user 101, based on the docking context indicated in the docking context information 107. The language model 111a for navigation has the highest weighting value 113a, which indicates that, based on the docking context, the language model 111a is the most likely to accurately predict the contents of the terms 103 encoded in the audio data 105. Based on the weighting values, the speech recognition system 104 selects the language model 111a to use for speech recognition of the audio data 105.

In some implementations, a single language model 111a is selected based on the weighting values 113a-113d. In some implementations, multiple language models 111a-111d can be selected based on the weighting values 113a-113d. For example, a subset including the top N language models 111a-111d can be selected and later used to identify candidate transcriptions for the audio data 105.

The speech recognition system 104 can also select a language model using the weighting values in combination with other factors. For example, the speech recognition system 104 can determine a weighted combination of the weighting values 113a-113d and other weighting values, such as weighting values based on previous words recognized in the speech sequence or based on previous transcriptions.

As an example, the speech recognition system 104 may transcribe a first term in a sequence as "play." Weighting values based on the docking context alone may indicate that either a navigation language model or a media language model should be used to recognize subsequent speech. A second set of weighting values based on other information (such as the output of a language model that was previously used to recognize the first term, "play") may indicate that either a game language model or a media language model should be used. Taking into account both sets of weighting values, the speech recognition system 104 can select the media language model as the most likely to yield an accurate transcription of the next term in the sequence. As described in this example, in some instances, different language models can be used to recognize different terms in a sequence, even though the docking context may be the same for each term in a sequence.

During state (F), the speech recognition system 104 performs speech recognition on the audio data 105 using the selected language model 111a. The speech recognition system 104 identifies a transcription for at least a portion of the audio data 105. The speech recognition system 104 is more likely to correctly recognize the terms 103 using the selected language model 111a than with a general language model. This is because the docking context indicates the types of terms most likely to be encoded in the audio data 105, and the selected language model 111a is selected to best predict those likely terms.

By using the selected language model 111a, the speech recognition system 104 may narrow the range of possible transcriptions for the term 103 to those indicated by the selected language model 111a. This can substantially improve speech recognition, especially for the first word in a phrase. Generally, there is a very large set of terms that can occur at the beginning of a speech sequence. For the first term in the sequence, the speech recognition system does not have the benefit of prior words in the sequence to indicate terms that are likely to follow. Nevertheless, even with the absence of prior terms that indicate a topic (e.g., "driving directions to" or "show map at"), the speech recognition system 104 still biases recognition to the correct set of terms because the selected language model 111a, selected based on the docking context, is already tailored to the likely content of the terms 103. Using the language model selected based on docking context can thus allow speech recognition as accurate or even more accurate than if the user had specified the topic of speech in a prefix phrase.

For the same reasons, speech recognition can be improved for single terms and for short sequences of terms, in which there are few interrelationships between words to guide speech recognition. Because search queries often include short sequences of terms, using a language model based on docking context can improve accuracy significantly in this application.

In the example, the spoken terms 103 include an address, "10 Main Street," and there is no spoken prefix phrase (e.g., "navigate to") that indicates that the terms 103 include an address. Still, based on the docking context in which the terms 103 were spoken, the speech recognition system 104 selects a specialized language model 111a that is trained (e.g., optimized or specialized) for addresses. This language model 111a can indicate a high probability that the first term encoded in the audio data 105 will be a number, and that the first term is then followed by a street name. The specialized vocabulary and patterns included in the selected language model 111a can increase the accuracy of the speech recognition of the audio data 105. For example, terms that are outside the focus of the selected language model 111a (e.g., terms unrelated to navigation) can be excluded from the language model 111a, thus excluding them as possible transcriptions for the terms 103. By contrast, those terms may be included as valid transcription possibilities in a general language model, which may include many terms that seem to be valid possibilities, but are in fact extraneous for recognizing the current terms 103.

Using the selected language model, the speech recognition system 104 selects a transcription, "10 Main Street," for the audio data 105. The transcription can be transmitted to the search engine system 109. The transcription can also be transmitted to the client device 102, allowing the user 101 can verify the accuracy of the transcription and make corrections if necessary.

During state (G), the search engine system 109 performs a search using the transcription of the spoken query terms 103. The search can be a web search, a search for navigation directions, or another type of search. Information indicating the results of the search query is transmitted to the client device 102. The transcription is determined using a specialized language model 111*a* that is selected based on the docking context. Accordingly, the likelihood that the transcription matches the query terms 103 spoken by the user 101 is greater than a likelihood using a general language model. As a result, the search query that includes the transcription is more likely to be the search that the user 101 intended.

Although the transcription of the terms 103 is described as being used in a search, various other uses of the transcription are possible. In other implementations, the transcription can be used to, for example, retrieve a map or directions, find and play music or other media, identify a contact and initiate communication, select and launch an application, locate and open a document, activate functionality of the mobile device 102 (such as a camera), and so on. For each of these uses, information retrieved using the transcription can be identified by one or more of a server system, the client device 102, or the docking station 106.

In some implementations, a different language model 111*a*-111*d* can be selected and used to recognize speech in different portions of the audio data 105. Even when the audio data 105 is associated with a single docking context, other information (such as other recognized words in a sequence) can affect the selection of a language model 111*a*-111*d*. As a result, different terms in a sequence can be recognized using different language models 111*a*-111*d*.

FIG. 2A is a diagram illustrating an example of a representation of a language model 200. In general, a speech recognition system receives audio data that includes speech and outputs one or more transcriptions that best match the audio data. The speech recognition system can simultaneously or sequentially perform multiple functions to recognize one or more terms from the audio data. For example, the speech recognition system can include an acoustic model and a language model 200. The language model 200 and acoustic model can be used together to select one or more transcriptions of the speech in the audio data.

The acoustic model can be used to identify terms that match a portion of audio data. For a particular portion of audio data, the acoustic model can output terms that match various aspects of the audio data and a weighting value or confidence score that indicates the degree that each term matches the audio data.

The language model 200 can include information about the relationships between terms in speech patterns. For example, the language model 200 can include information about sequences of terms that are commonly used and sequences that comply with grammar rules and other language conventions. The language model 200 can be used to indicate the probability of the occurrence of a term in a speech sequence based on one or more other terms in the sequence. For example, the language model 200 can identify which word has the highest probability of occurring at a particular part of a sequence of words based on the preceding words in the sequence.

The language model 200 includes a set of nodes 201*a*-201*i* and transitions 202*a*-202*h* between the nodes 201*a*-201*i*. Each node 201*a*-201*i* represents a decision point at which a single term (such as a word) is selected in a speech sequence. Each transition 202*a*-202*h* outward from a node 201*a*-201*i* is associated with a term that can be selected as a component of the sequence. Each transition 202*a*-202*h* is also associated with a weighting value that indicates, for example, the probability that the term associated with the transition 202*a*-202*h* occurs at that point in the sequence. The weighting values can be set based on the multiple previous terms in the sequence. For example, the transitions at each node and the weighting values for the transitions can be determined on the N terms that occur prior to the node in the speech sequence.

As an example, a first node 201*a* that represents a decision point at which the first term in a speech sequence is selected. The only transition from node 201*a* is transition 202*a*, which is associated with the term "the." Following the transition 202*a* signifies selecting the term "the" as the first term in the speech sequence, which leads to the next decision at node 201*b*.

At the node 201*b* there are two possible transitions: (1) the transition 202*b*, which is associated with the term "hat" and has a weighting value of 0.6; and (2) the transition 202*c*, which is associated with the term "hats" and has a weighting value of 0.4. The transition 202*b* has a higher weighting value than the transition 202*c*, indicating that the term "hat" is more likely to occur at this point of the speech sequence than the term "hats." By selecting the transition 202*a*-202*h* that has the highest weighting value at each node 201*a*-201*i*, a path 204 is created that indicates the most likely sequence of terms, in this example, "the hat is black."

The weighting values of transitions in the language model can be determined based on language patterns in a corpus of example text that demonstrates valid sequences of terms. One or more of the following techniques can be used. Machine learning techniques such as discriminative training can be used to set probabilities of transitions using Hidden Markov Models ("HMMs"). Weighted finite-state transducers can be used to manually specify and build the grammar model. N-gram smoothing can be used to count occurrences of n-grams in a corpus of example phrases and to derive transition probabilities from those counts. Expectation-maximization techniques, such as the Baum-Welch algorithm, can be used to set the probabilities in HMMs using the corpus of example text.

Figure 2B:
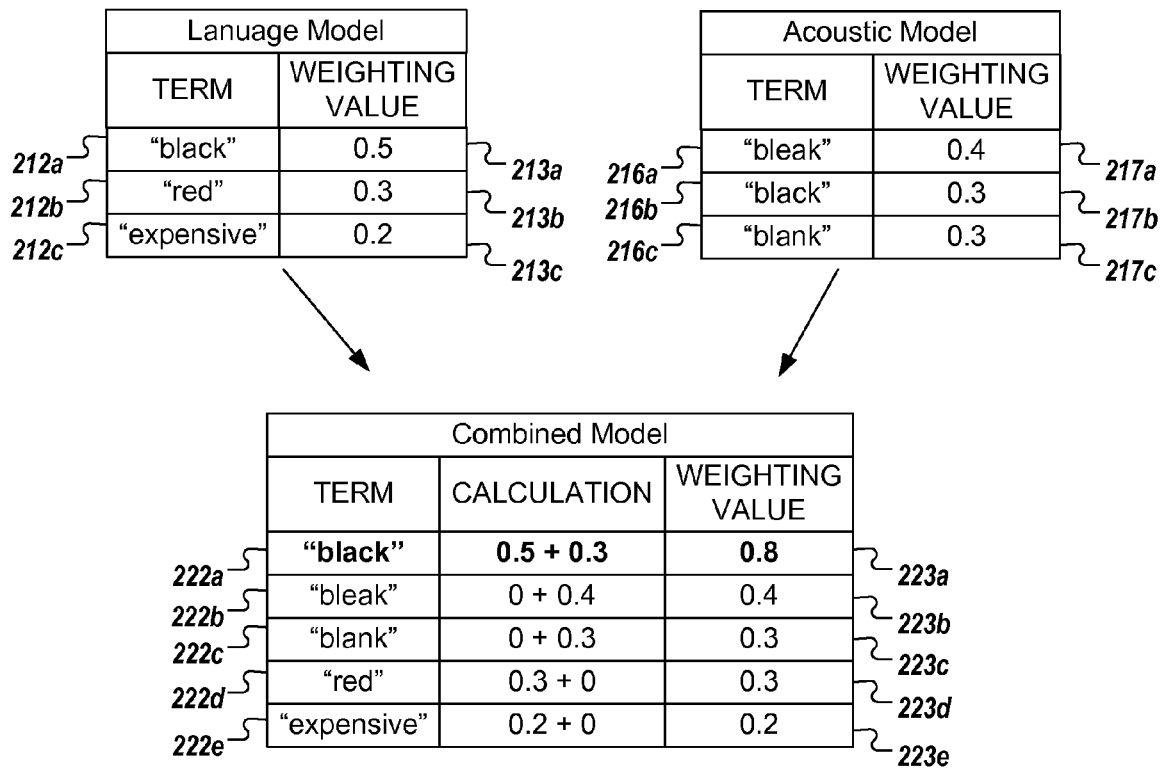
FIG. 2B is a diagram illustrating an example of a use of an acoustic model with the language model illustrated in FIG. 2A.

FIG. 2B is a diagram illustrating an example of a use of an acoustic model with the language model illustrated in FIG. 2A. The output of the language model can be combined with output of the acoustic model to select a transcription for audio data. For example, FIG. 2B illustrates the combination of the output from the acoustic model and the language model for the portion of audio data that corresponds to a single term. In particular, FIG. 2B illustrates the output for audio data that corresponds to the term selected by a transition 202*f*-202*h* from the node 201*d* in FIG. 2A. The language model outputs the terms 212*a*-212*c* and corresponding weighting values 213*a*-213*c* that are associated with the highest-weighted transitions from the node 201*d*. The acoustic model outputs the terms 216*a*-216*c* that best match the audio data, with corresponding weighting values 217*a*-217*c* that indicate the degree that the terms 216*a*-216*c* match the audio data.

The weighting values 213*a*-213*c* and 217*a*-217*c* are combined to generate combined weighting values 223*a*-223*e*, which are used to rank a combined set of terms 222a-222e. As illustrated, based on the output of the acoustic model and the language model, the term 222a "black" has the highest combined weighting value 223a and is thus the most likely transcription for the corresponding portion of audio data. Although the weighting values 213a-213c, 217a-217c output by the acoustic model and language model are shown to have equal influence in determining the combined weighting values 223a-223e, the weighting values 213a-213c, 217a-217c can also be combined unequally and can be combined with other types of data.

Figure 3:
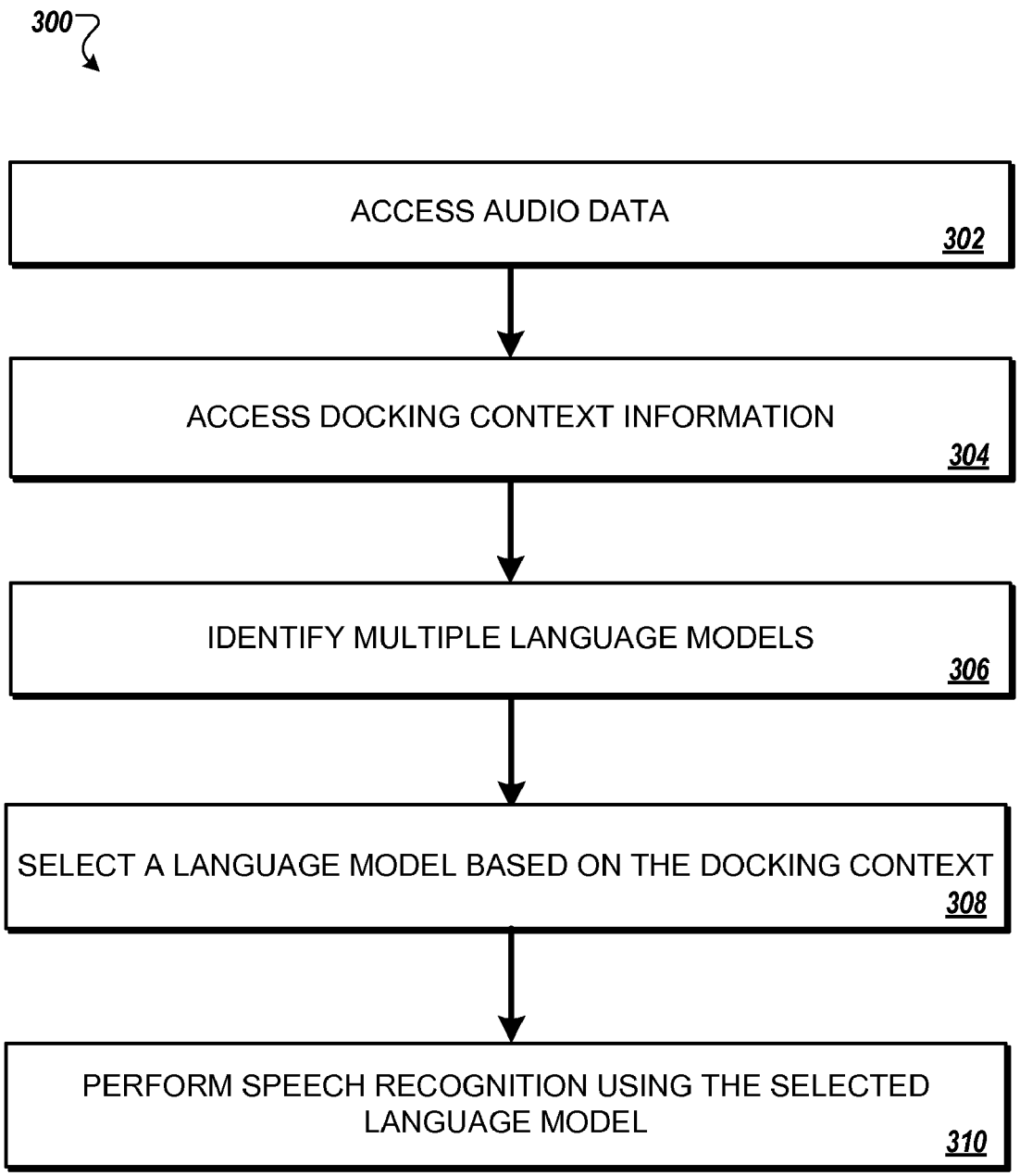
FIG. 3 is a flow diagram illustrating an example of a process for performing speech recognition using a docking context of a client device.

FIG. 3 is a flow diagram illustrating an example of a process 300 for performing speech recognition using a docking context of a client device. Briefly, the process 300 includes accessing audio data that includes encoded speech. Information that indicates a docking context of a client device is accessed. Multiple language models are identified. At least one of the language models is selected based on the docking context. Speech recognition is performed on the audio data using the selected language model.

In greater detail, audio data that includes encoded speech is accessed (302). The audio data can be received from a client device. The encoded speech can be speech detected by the client device, such as speech recorded by the client device. The encoded speech can include one or more spoken query terms.

Information that indicates a docking context of a client device is accessed (304). The docking context can be associated with the audio data. The information that indicates a docking context can be received from a client device. For example, the information that indicates a docking context can indicate whether the client device was connected to a docking station while the speech encoded in the audio data was detected by the client device. The information that indicates a docking context can also indicate a type of docking station to which the client device was connected while the speech encoded in the audio data was detected by the client device.

The information that indicates a docking context can indicate a connection between the client device and a second device with which the client device is wirelessly connected. The information that indicates a docking context can indicate a connection between the client device and a second device with which the client device is physically connected.

Multiple language models are identified (306). Each of the multiple language models can indicate a probability of an occurrence of a term in a sequence of terms based on other terms in the sequence. Each of the multiple language models can be trained for a particular topical category of words. The topical categories of words can be different for each language model. One or more of the multiple language models can include a portion of or subset of a language model. For example, one or more of the multiple language models can be a submodel of another language model.

At least one of the identified language models is selected based on the docking context (308). For example, a weighting value for each of the identified language models can be determined based on the docking context. The weighting values can be assigned to the respective language models. Each weighting value can indicate a probability that the language model to which it is assigned will indicate a correct transcription the encoded speech. Determining weighting values for each of the language models can include accessing stored weighting values associated with the docking context. Determining weighting values for each of the language models can include accessing stored weighting values and altering the stored weighting values based on the docking context.

Determining a weighting value based on the docking context can include, for example, determining that the client device is connected to a vehicle docking station, and determining, for a navigation language model trained to output addresses, a weighting value that increases the probability that the navigation language model is selected relative to the other identified language models.

Speech recognition is performed on the audio data using the selected language model (310). A transcription is identified for at least a portion of the audio data. For example, a transcription for one or more spoken terms encoded in the audio data can be generated.

The encoded speech in the audio data can include spoken query terms, and the transcription of a portion of the audio data can include a transcription of the spoken query terms. The process 300 can include causing a search engine to perform a search using a transcription of one or more spoken query terms and providing information identifying the results of the search query to the client device.

Figure 4:
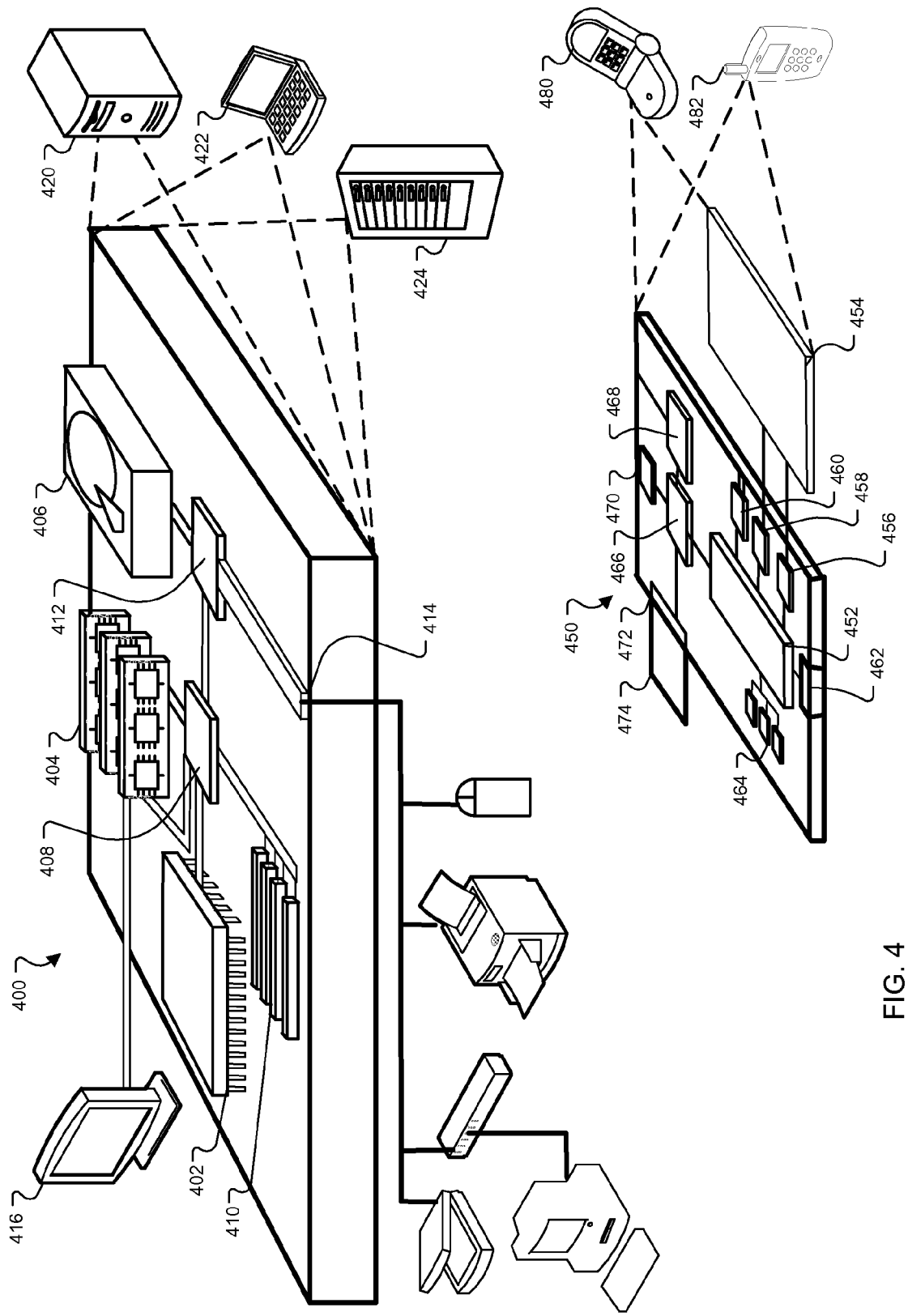
FIG. 4 is a block diagram of computing devices.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of client devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface controller 408 connecting to memory 404 and high-speed expansion ports 410, and a low speed interface controller 412 connecting to a low-speed expansion port 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

Additionally, computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device.

The high-speed interface controller 408 manages bandwidth-intensive operations for the computing device 400, while the low-speed interface controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a client device (not shown), such as device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive, solid state storage component, or other device, to provide additional storage. Each of the components 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 402 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In-line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar client device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Also, although several applications of providing incentives for media sharing and methods have been described, it should be recognized that numerous other applications are contemplated. Accordingly, other implementations are within the scope of the following claims.

What is claimed is:

1. A computer-implemented method, comprising:
accessing audio data that includes encoded speech;
accessing information that indicates a docking context of a client device, the docking context being associated with the audio data;
identifying a plurality of language models;
identifying multiple sets of weighting values for the plurality of language models, the multiple sets of weighting values comprising at least
a first set of multiple weighting values that correspond to multiple language models of the plurality of language models, the first set of multiple weighting values being associated with a first key phrase, wherein the first set of multiple weighting values is used to bias selection of a language model when a user utters the first key phrase, and
a second set of multiple weighting values that correspond to multiple language models of the plurality of language models, the second set of multiple weighting values being associated with a second key phrase, the second set of multiple weighting values being different from the first set of multiple weighting values, and the second key phrase being different from the first key phrase;
determining that the docking context indicates docking of the client device with a docking station of a first type;
based on determining that the docking context indicates docking of the client device with the docking station of the first type, selecting, from among the multiple sets of weighting values, the first set of multiple weighting values associated with the first key phrase;
selecting at least a first language model of the plurality of language models using the first set of multiple weighting values associated with the first key phrase; and
performing speech recognition on the audio data using the first language model to identify a transcription for a portion of the audio data.

2. The computer-implemented method of claim 1, wherein the information that indicates a docking context of the client device indicates a connection between the client device and a second device with which the client device is physically connected.

3. The computer-implemented method of claim 1, wherein the information that indicates a docking context of the client device indicates a connection between the client device and a second device with which the client device is wirelessly connected.

4. The computer-implemented method of claim 1, wherein identifying the multiple sets of weighting values for the plurality of language models comprises identifying multiple sets of weighting values, each set of weighting values indicating probabilities that the respective language models of the plurality of language models will indicate a correct transcription for speech when a key phrase associated with the set of weighting values occurs in the speech.

5. The computer-implemented method of claim 1, wherein the speech encoded in the audio data was detected by the client device, and wherein the information that indicates a docking context indicates whether the client device was connected to a docking station while the speech encoded in the audio data was detected by the client device.

6. The computer-implemented method of claim 1, wherein the speech encoded in the audio data was detected by the client device, and wherein the information that indicates a docking context indicates a type of docking station to which the client device was connected while the speech encoded in the audio data was detected by the client device.

7. The computer-implemented method of claim 1, wherein the encoded speech includes one or more spoken query terms, and wherein the transcription includes a transcription of the spoken query terms, and wherein the method further comprises:
causing a search engine to perform a search using the transcription of the one or more spoken query terms; and
providing information indicating the results of the search query to the client device.

8. The computer-implemented method of claim 1, wherein each of the plurality of language models is trained for a particular topical category of words.

9. The computer-implemented method of claim 1, wherein:
determining that the docking context indicates docking of the client device with a docking station of a first type comprises determining that the docking context indicates that the docking station is a vehicle docking station; and
based on determining that the docking context indicates docking of the client device with the docking station of the first type, selecting, from among the multiple sets of weighting values, the first set of multiple weighting values associated with the first key phrase comprises:
in response to determining that the docking context indicates that the docking station is a vehicle docking station, selecting a set of weighting values that increases the probability that a navigation language model is selected relative to the other language models in the plurality of language models.

10. The method of claim 1, wherein the first type is selected from a group consisting of a media player docking station type, a vehicle docking station type, and a computer docking station type.

11. The method of claim 1, wherein:
determining that the docking context indicates docking of the client device with the docking station of the first type comprises determining that the docking station is a vehicle docking station;
selecting, from among the multiple sets of weighting values, the first set of multiple weighting values associated with the first key phrase comprises selecting a set of weighting values associated with a key phrase that is associated with navigation; and
selecting at least the first language model of the plurality of language models comprises selecting a language model associated with navigation.

12. The method of claim 1, wherein:
determining that the docking context indicates docking of the client device with the docking station of the first type comprises determining that the docking station is a media playing device;
selecting, from among the multiple sets of weighting values, the first set of multiple weighting values associated with the first key phrase comprises selecting a set of weighting values associated with a key phrase that is associated with media; and
selecting at least the first language model of the plurality of language models comprises selecting a language model associated with media.

13. The method of claim 1, wherein:
determining that the docking context indicates docking of the client device with the docking station of the first type comprises determining that the docking station is a computer;
selecting, from among the multiple sets of weighting values, the first set of multiple weighting values associated with the first key phrase comprises selecting a set of weighting values associated with a key phrase that is associated with Internet searching; and
selecting at least the first language model of the plurality of language models comprises selecting a language model associated with Internet searching.

14. The computer-implemented method of claim 1, further comprising:
accessing second audio data that includes encoded speech;
accessing information that indicates a second docking context of the client device, the second docking context being associated with the second audio data;
determining that the second docking context indicates docking of the client device with a second docking station of a second type, the second type being different from the first type;
based on determining that the second docking context indicates docking of the client device with the second docking station of the second type, selecting, from among the multiple sets of weighting values, the second set of multiple weighting values associated with the second key phrase;
selecting at least a second language model of the plurality of language models using second set of multiple weighting values associated with the second key phrase, the second language model being different from the first language model; and
performing speech recognition on the second audio data using the second language model to identify a transcription for a portion of the second audio data,
wherein docking stations of the first type provide capabilities for one or more first manners of using the client device, and wherein docking stations of the second type provide capabilities for one or more second manners of using the client device that are different from the one or more first manners of using the client device.

15. The computer-implemented method of claim 1, wherein identifying multiple sets of weighting values for the plurality of language models comprises identifying multiple sets of weighting values that bias selection of language models, each of the multiple sets of weighting values biasing selection of language models for recognizing utterances in audio input when a key phrase associated with the set of weighting values is recognized in the audio input.

16. The computer-implemented method of claim 15, wherein selecting, from among the multiple sets of weighting values, the set of weighting values associated with the first key phrase comprises selecting the first set of multiple weighting values based on determining that the first docking context indicates docking of the client device with the first docking station of the first type, without recognizing the first key phrase associated with the first set of multiple weighting values.

17. The computer-implemented method of claim 1, further comprising:
accessing second audio data that includes encoded speech;
determining that the encoded speech included in the second audio data includes the first key phrase;
based on determining that the encoded speech included in the second audio data includes the first key phrase, selecting, from among the multiple sets of weighting values, the first set of multiple weighting values associated with the first key phrase;

selecting at least a first language model of the plurality of language models using the first set of multiple weighting values associated with the first key phrase; and performing speech recognition on the second audio data using the first language model to identify a transcription for a portion of the second audio data.

18. The computer-implemented method of claim 1, wherein identifying multiple sets of weighting values for the plurality of language models comprises identifying sets of weighting values that each comprise a weighting value corresponding to each language model of the plurality of language models.

19. The computer implemented method of claim 1, wherein identifying multiple sets of weighting values for the plurality of language models comprises identifying the second set of multiple weighting values, wherein the second set of multiple weighting values is used to bias selection of a language model when a user utters the second key phrase.

20. A system comprising:
one or more processors; and
a computer-readable medium coupled to the one or more processors having instructions stored thereon which, when executed by the one or more processors, cause the system to perform operations comprising:
  accessing audio data that includes encoded speech;
  accessing information that indicates a docking context of a client device, the docking context being associated with the audio data;
  identifying a plurality of language models;
  identifying multiple sets of weighting values for the plurality of language models, the multiple sets of weighting values comprising at least
    a first set of multiple weighting values that correspond to multiple language models of the plurality of language models, the first set of multiple weighting values being associated with a first key phrase, wherein the first set of multiple weighting values is used to bias selection of a language model when a user utters the first key phrase, and
    a second set of multiple weighting values that correspond to multiple language models of the plurality of language models, the second set of multiple weighting values being associated with a second key phrase, the second set of multiple weighting values being different from the first set of multiple weighting values, and the second key phrase being different from the first key phrase;
  determining that the docking context indicates docking of the client device with a docking station of a first type;
  based on determining that the docking context indicates docking of the client device with the docking station of the first type, selecting, from among the multiple sets of weighting values, the first set of multiple weighting values associated with the first key phrase;
  selecting at least a first language model of the plurality of language models using the first set of multiple weighting values associated with the first key phrase; and
  performing speech recognition on the audio data using the first language model to identify a transcription for a portion of the audio data.

21. The system of claim 20, wherein identifying the multiple sets of weighting values for the plurality of language models comprises identifying multiple sets of weighting values, each set of weighting values indicating probabilities that the respective language models of the plurality of language models will indicate a correct transcription for speech when a key phrase associated with the set of weighting values occurs in the speech.

22. The system of claim 20, wherein the speech encoded in the audio data was detected by the client device, and wherein the information that indicates a docking context indicates whether the client device was connected to a docking station while the speech encoded in the audio data was detected by the client device.

23. The system of claim 20, wherein the speech encoded in the audio data was detected by the client device, and wherein the information that indicates a docking context indicates a type of docking station to which the client device was connected while the speech encoded in the audio data was detected by the client device.

24. A non-transitory computer storage medium encoded with a computer program, the program comprising instructions that when executed by one or more computers cause the one or more computers to perform operations comprising:
  accessing audio data that includes encoded speech;
  accessing information that indicates a docking context of a client device, the docking context being associated with the audio data;
  identifying a plurality of language models;
  identifying multiple sets of weighting values for the plurality of language models, the multiple sets of weighting values comprising at least
    a first set of multiple weighting values that correspond to multiple language models of the plurality of language models, the first set of multiple weighting values being associated with a first key phrase, wherein the first set of multiple weighting values is used to bias selection of a language model when a user utters the first key phrase, and
    a second set of multiple weighting values that correspond to multiple language models of the plurality of language models, the second set of multiple weighting values being associated with a second key phrase, the second set of multiple weighting values being different from the first set of multiple weighting values, and the second key phrase being different from the first key phrase;
  determining that the docking context indicates docking of the client device with a docking station of a first type;
  based on determining that the docking context indicates docking of the client device with the docking station of the first type, selecting, from among the multiple sets of weighting values, the first set of multiple weighting values associated with the first key phrase;
  selecting at least a first language model of the plurality of language models using the first set of multiple weighting values associated with the first key phrase; and
  performing speech recognition on the audio data using the first language model to identify a transcription for a portion of the audio data.

25. The computer storage medium of claim 24, wherein identifying the multiple sets of weighting values for the plurality of language models comprises identifying multiple sets of weighting values, each set of weighting values indicating probabilities that the respective language models of the plurality of language models will indicate a correct transcription for speech when a key phrase associated with the set of weighting values occurs in the speech.

26. The computer storage medium of claim 24, wherein the speech encoded in the audio data was detected by the client device, and wherein the information that indicates a docking context indicates whether the client device was connected to a docking station while the speech encoded in the audio data was detected by the client device.

27. The computer storage medium of claim 24, wherein the speech encoded in the audio data was detected by the client device, and wherein the information that indicates a docking context indicates a type of docking station to which the client device was connected while the speech encoded in the audio data was detected by the client device.

28. The computer storage medium of claim 24, wherein the encoded speech includes one or more spoken query terms, and wherein the transcription includes a transcription of the spoken query terms, and wherein the operations further comprise:
    causing a search engine to perform a search using the transcription of the one or more spoken query terms; and
    providing information indicating the results of the search query to the client device.

\* \* \* \* \*